United States Patent [19]

Harbers

[11] Patent Number: 4,808,805

[45] Date of Patent: Feb. 28, 1989

[54] MENU DEVICE

[75] Inventor: H. C. Harbers, Templeton, Calif.

[73] Assignee: Escorp, Inc., San Luis Obispo, Calif.

[21] Appl. No.: 916,942

[22] Filed: Oct. 8, 1986

[51] Int. Cl.[4] .............................................. G06K 19/06

[52] U.S. Cl. ...................................... 235/490; 235/487

[58] Field of Search ......................... 235/487, 490, 448

[56] References Cited

U.S. PATENT DOCUMENTS

| | | | |
|---|---|---|---|
| 2,453,239 | 12/1945 | Luhn | 235/448 |
| 3,916,159 | 10/1975 | Castillo | 235/490 |
| 4,128,757 | 12/1978 | Garner | 235/448 X |

FOREIGN PATENT DOCUMENTS

| | | | |
|---|---|---|---|
| 2046040 | 9/1970 | Fed. Rep. of Germany | 235/448 |

*Primary Examiner*—Harold I. Pitts
*Attorney, Agent, or Firm*—William W. Haefliger

[57] ABSTRACT

A menu device comprises (a) a card, (b) successive rows of indicia on the card listing items to be selected, (c) rows of bubbles on the card in alignment with said rows of indicia, the bubbles having positions on the card representative of numbers of items to be selected, (d) each bubble having a first position projecting upwardly from the plane of the card, and a second position into which it is displaced relative to the plane of the card, by finger pressure, to indicate selection of a number of said items corresponding to bubble position on the card.

30 Claims, 3 Drawing Sheets

FIG. 3.
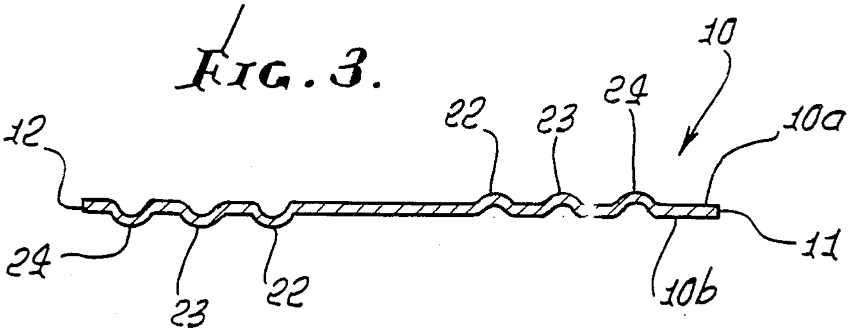
FIG. 4.
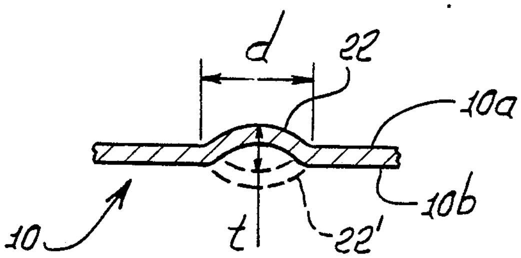
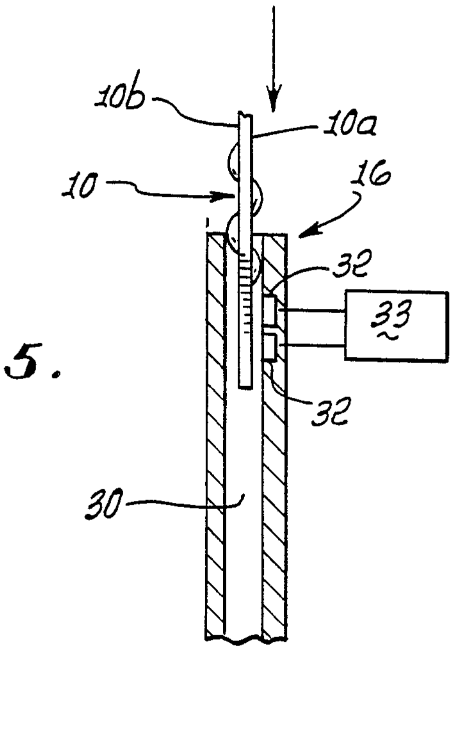
FIG. 5.

MENU DEVICE

BACKGROUND OF THE INVENTION

This invention relates generally to the selecting and filling of orders, and more particularly to a very simple, re-usable card on which orders can be entered, and which is readable by a machine, or by human eye, to fill orders.

There is need, as for example at fast food take-out establishments, for means to enable rapid conversion of desired food orders into assembled food groupings ready to be taken out. A major problem is the time required for the purchaser to think through and remember what he desires, as he attempts to quickly convey this information to a clerk. Order changes are frequent as the purchaser attempts to state items and number of items to the clerk, while he re-thinks his desires and the desires of others accompanying him or her, at the fast food establishment. There is a great deal of time wasted, and the order filling process is slowed, to the inconvenience of those waiting in line to have their orders filled. There is need for means or system that obviates these and similar problems.

SUMMARY OF THE INVENTION

It is a major object of the invention to provide a solution to the above problems, and difficulties, through provision of a menu ordering device easily usable to pre-select total orders of a large number of possible items of merchandise, and enabling changing of item selection, and without requiring a pen or pencil, or permanent deformation, of the device.

Basically, the device comprises:

(a) a card, (b) successive rows of indicia on the card listing items to be selected, (c) rows of bubbles on the card in alignment with the rows of indicia, the bubbles having positions on the card representative of numbers of items to be selected, (d) each bubble having a first position projecting upwardly from the plane of the card, and a second position into which it is displaced relative to the plane of the card, by finger pressure, to indicate selection of a number of said items corresponding to bubble position on the card.

As will appear, there may be at least three bubbles in each row, the three bubbles positioned to represent 1, 2 and 4 items to be selected. Certain rows may contain one or more bubbles. Rows of such bubbles are typically arranged in a column on the card, the bubbles advantageously being unitary with the card. Also, bubbles in successive rows are typically staggered to enable concentration of bubbles and corresponding items, for card size minimization for a given number of items (and corresponding bubbles) on a card.

A further object is the provision of a bubble reader, in the form of means forming a card receiving opening into which the card and bubbles thereon are received with certain selected bubbles displaced as referred to, for detecting which of the bubbles are so displaced.

A still further object is the provision of a method for using the card, which comprises:

(a) user reading of the rows of indicia to determine which of said items are to be selected, and the number or numbers of each selected item, (b) and displacing a selected bubble or bubbles in the rows in alignment with selected items, the selected bubbles corresponding to the desired number of such selected items.

The three bubbles are typically selectively displaced to correspond to 1, 2 and/or 4 items, in each row; and the clerk may return the bubbles to original position as the order is filled, as a checking device, and also enabling the card to be re-usable.

These and other objects and advantages of the invention, as well as the details of an illustrative embodiment, will be more fully understood from the following specification and drawings, in which:

DRAWING DESCRIPTION

FIG. 3 is a section taken on lines 3—3 of FIG. 1;

FIG. 4 is an enlarged section showing bubble construction, and, multiple positions, and FIG. 5 is a vertical section showing bubble sensor means.

DETAILED DESCRIPTION

Figure 1:
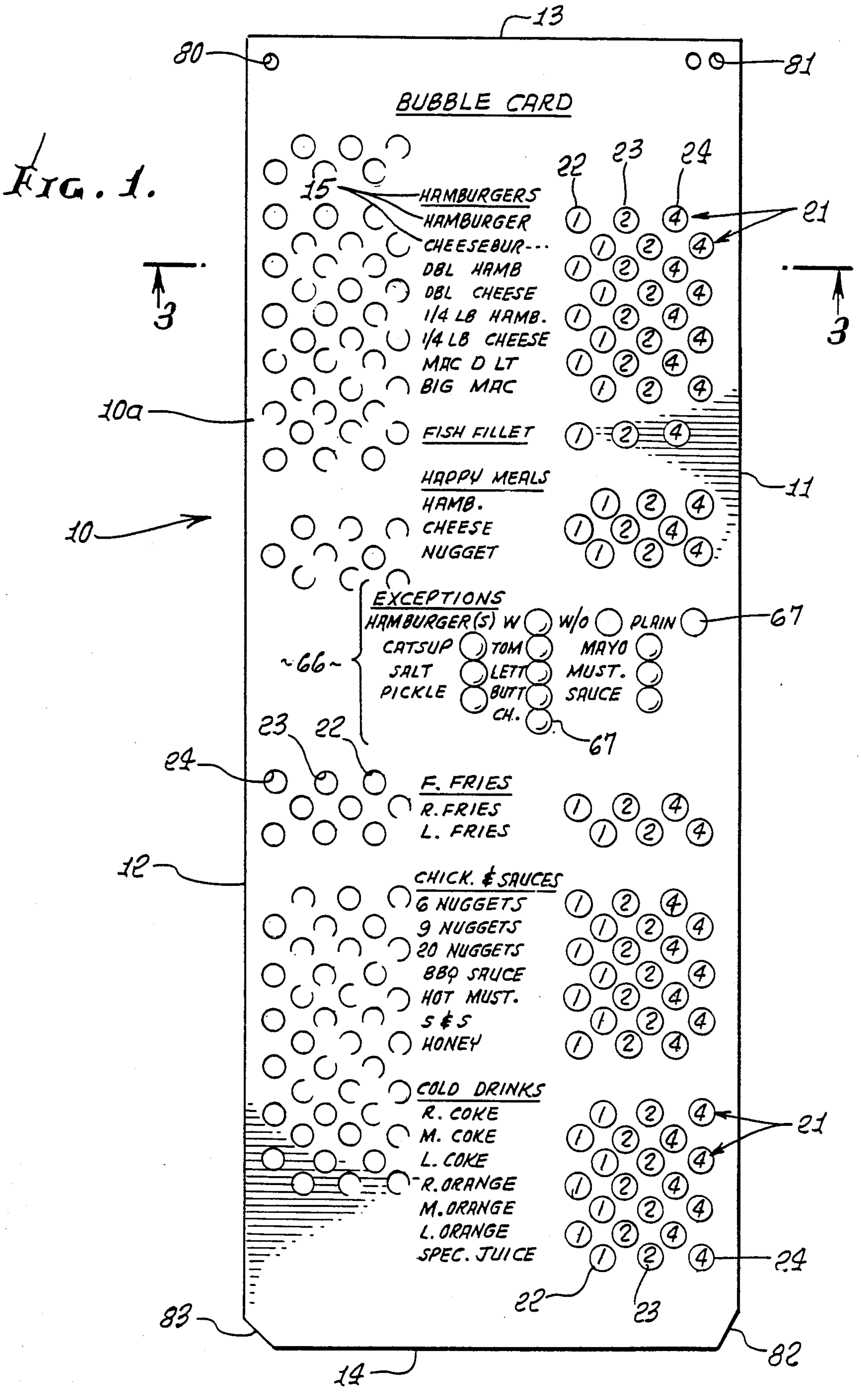
FIG. 1 is a plan view of a card incorporating the invention.

In the drawings, a card 10 is typically rectangular and has opposite faces 10*a* and 10*b*, and edges 11–14. As shown the card is vertically elongated to bear multiple horizontal rows 15 of indicia, in a column, as for example at least ten rows but it may have other forms and shapes. It may be foldable, and bendable, and it is peripherally sized to fit vertically in a shirt or pants pocket so that a customer may conveniently carry it to a store to obtain items of merchandise pre-selected on the card.

Figure 2:
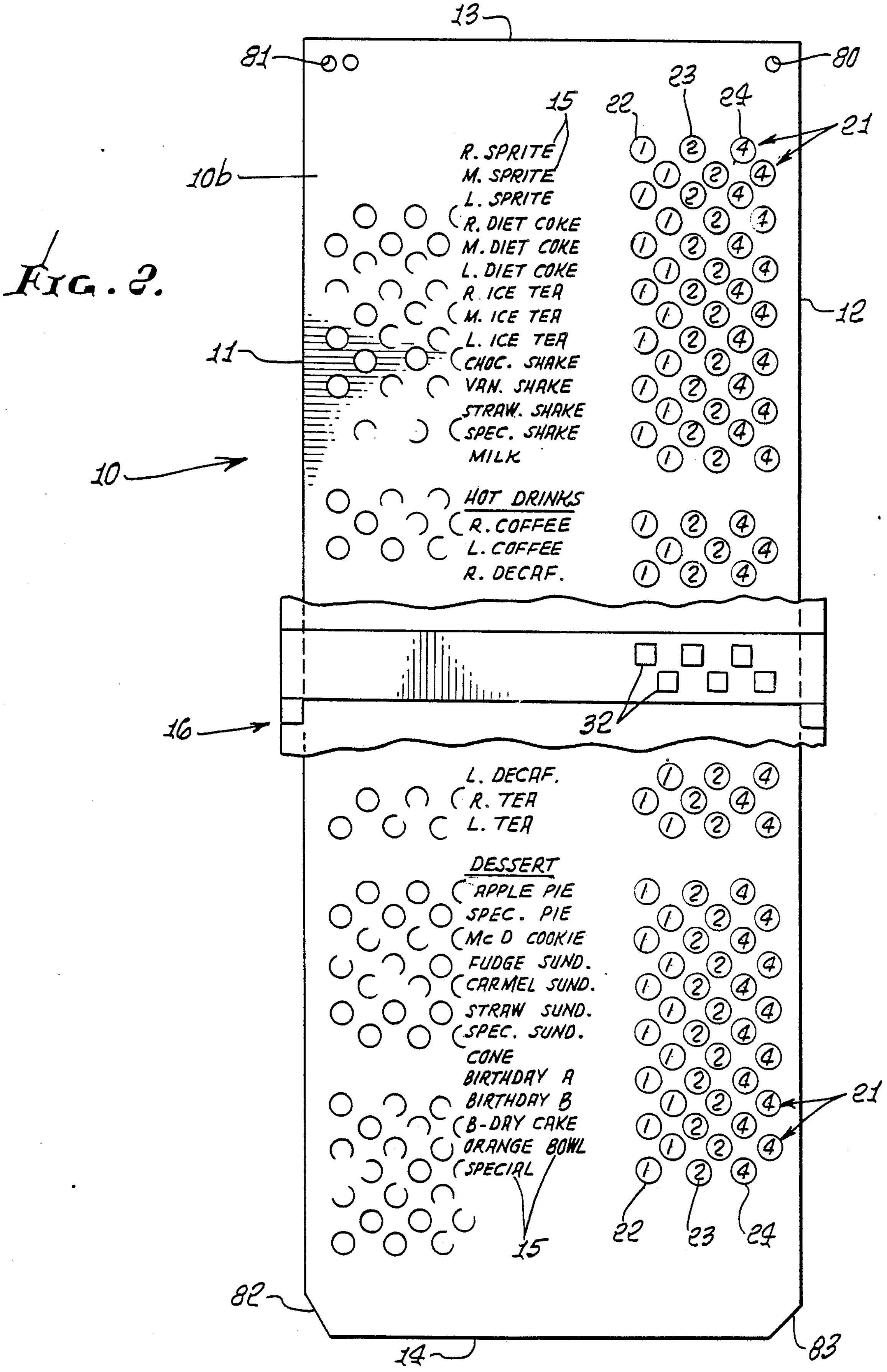
FIG. 2 is a plan view of the back side of the FIG. 1 card (or a similar card) incorporating the invention, together with associated bubble sensor apparatus.

Each row of indicia typically indicates an item of merchandise to be selected by the said bearer, and to be detected by a device 16 into which the card is removably receivable, as at the store, the latter for example being represented by a fast food take-out establishment. Thus, the items of merchandise to be selected may include fast food items, as are indicated in FIGS. 1 and 2; however, other items to be selected may appear on the card.

Further in accordance with the invention, rows 21 of bubbles are located on the card in horizontal alignment with the rows of indicia, the bubbles having positions on the card representative of numbers of items to be selected. Preferably there are at least three bubbles 22, 23 and 24 in each row, the three bubbles as shown representing the numbers 1, 2 and 4 of the same items, so that up to seven such items may be selected merely by manipulating one or more of the three bubbles.

As shown, a typical bubble 22 has a first stable position (see full lines in FIG. 4) projecting upwardly from the plane of the card, and a second stable position 22' into which it is displaced, relative to the plane of the card, by finger pressure in order to indicate selection of an associated number or numbers of the selected items to be ordered. Thus if a bubble 22 in the first column is displaced to position 22', one such item is to be ordered; if a bubble 23 in the second column is displaced to a position corresponding to 22', two such items are to be ordered; and if the bubble 24 in the third column is similarly displaced, four such items are to be ordered. The possible configurations are:

| | Items to be ordered |
|---|---|
| Displaced bubble 22 | 1 |
| Displaced bubble 23 | 2 |
| Displaced bubbles 22 and 23 | 3 |
| Displaced bubble 24 | 4 |
| Displaced bubbles 24 & 22 | 5 |
| Displaced bubbles 23 & 24 | 6 |
| Displaced bubbles 22, 23 & 24 | 7 |

Of advantage is the fact that the bubble may be returned to original (up) position, so that one can adjust and re-adjust his total order prior to presenting the card to the bubble "reader" (detector) at the store; and the card is therefore re-usable after it has been "read" at the store, i.e. the user can take it with him for leisurely selection of items to be ordered, as at his home, followed by re-presentation to the card reader at the store for instant reading of the total order. Also, the store clerk can use the card for order filling check-out, i.e. as the items of merchandise or fast food are assembled on a counter, the corresponding displaced bubbles are returned to initial position by finger pressure on them at the reverse side of the card, where the bubbles project outwardly (from the plane of the card, at that reverse side). To assist in this process, the reverse side of the card may bear rows of indicia the same as or similar to the indicia on the front side of the card, so that the clerk can maintain the card in turned-over state and press the displaced bubbles at that reverse side while reading corresponding indicia on the reverse side, as the items are assembled.

The card may advantageously consist of polystyrene so that the bubbles formed integrally with the card, as a one-piece unit, have flexible displaceability between two stable states as described. In order that at least 10 rows of such bubbles and indicia can be assembled on a menu card the bubbles typically have diameter "d" less than 3/8 inch, and such diameter should not be less than 3/16 inch to enable user finger displacement. Also the bubbles should undergo displacement "t" between stable states, where "t" exceeds twice the card (and bubble) thickness. Card thickness is desirably between 0.003 and 0.009 inch, for desired card flexibility, and bubble displaceability between states.

FIGS. 2 and 5 show a card reader 16 defining a slot 30 into which a card is received during bubble reading or detecting. Proximity or other type detectors are shown at 32, to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms.

It will be noted that successive rows of bubles in the column are staggered. This allows greater vertical concentration of bubbles, while maintaining distances or gaps between the bubbles in successive rows, required by the reader.

Also, "1" bubbles can have one color, "2" bubbles another color, and "4" bubbles a third color, to aid in bubble selection to correspond to numbers of items desired.

Referring again to FIG. 1, area 66 incorporates "exceptions" to the other items on the card; i.e., each listed item (catsup, etc.) in area 66 has associated with it only one bubble, as at 67 for example, since only one order of that item is made. Such bubbles 67 are of the same configuration and operation as the bubbles described above.

With reference to FIG. 2, the rear side of the card shows a second column of bubbles 21, to the right of the additional rows of indicia 15, complementing those indicia shown in FIG. 1. Maximum use of space on the card is thereby made, by having the indicia in a central column on each side of the card, and bubbles in a column to the right of the indicia column. Staggering of bubbles, as shown, adds further to space utilization, since it enables vertical condensation of the indicia rows. To the left of the indicia column on each side appear the rear sides of the bubbles that are associated with indicia on the opposite side of the card.

Associated with corners of the cards are means (bevels, of different angularity, or holes) that are detectable by the sensor apparatus to orient the sensor circuitry to the card orientation, as inserted into the sensor. Thus, either end of the card may be inserted into the sensor, and the card may face up or down. See holes 80 and 81, and beads 82 and 83.

I claim:

1. A menu device, comprising (a) a card, (b) successive rows of indicia on the card listing items to be selected, (c) rows of bubbles on the card in alignment with said rows of indicia, the bubbles having positions on the card representative of numbers of items to be selected, (d) each bubble having a first position projecting upwardly from the plane of the card, and a second position into which it is displaced relative to the plane of the card, by finger pressure, to indicate selection of a number of said items corresponding to bubble position on the card, (e) the bubbles being arrayed in two columns, one column of bubbles to the right of indicia on one side of the card, and another column of bubbles to the right of indicia on the opposite side of the card, (f) there being at least three bubbles in each row, the three bubbles positioned to represent 1, 2 and 4 items to be selected.

2. The device of claim 1 wherein the bubbles in successive rows are staggered.

3. The device of claim 1 wherein the bubbles are unitary with the card.

4. The device of claim 3 wherein the bubbles are of substantially the same diameter, which is less than about ½ inch.

5. The device of claim 3 wherein the bubbles have diameter between 3/16 and 3/8 inch.

6. The device of claim 3 wherein the bubbles have thickness of between 0.003 and 0.008 inch.

7. The device of claim 1 wherein there are at least 10 rows of bubbles on the card and of one-piece construction therewith.

8. The device of claim 7 wherein the card and bubbles consist of polystyrene.

9. The device of claim 1 including means forming a card receiving opening into which the card and bubbles thereon are removably received, with certain selected bubbles displaced as referred to, for detecting which of the bubbles are so displaced.

10. The method of using the device of claim 1 which includes, (i) reading said rows of indicia to determine which of said items are to be selected and the number or numbers of each selected items.

(ii) and displacing a selected bubble or bubbles in the rows in alignment with selected said items, the selected bubbles corresponding to the desired number of said selected items.

11. The method of claim 10 wherein bubbles are displaced to correspond to 1, 2 or 4 items, in each row.

12. The method of claim 1 including detecting which button has been displaced in order to fill the order of said items.

13. The method of claim 12 including returning the bubbles to initial position as orders for selected items are filled.

14. The device of claim 1 wherein there are additional item indicia on the card and single bubbles on the card respectively associated with said additional items.

15. The device of claim 1 including a bubble reader into which the card is insertible, and means on the card to be detected by circuitry associated with said reader to sense the orientation of the card relative to the reader.

16. The device of claim 15 wherein said means comprises different configurations of the card at card corners.

17. The device of claim 15 wherein said means on the card comprises a corner bevel.

18. A menu device, comprising (a) a card, (b) successive rows of indicia on the card listing items to be selected, (c) rows of bubbles on the card in alignment with said rows of indicia, the bubbles having positions on the card representative of numbers of items to be selected, (d) each bubble having a first position projecting upwardly from the plane of the card, and a second position into which it is displaced relative to the plane of the card, by finger pressure, to indicate selection of a number of said items corresponding to bubble position on the card, (e) the bubbles being arrayed in two columns, one column of bubbles to the right of indicia one side of the card, and another column of bubbles to the right of indicia on the opposite side of the card.

19. The device of claim 18 wherein there are at least three bubbles in each row.

20. The device of claim 18 wherein said rows of bubbles form said columns, there being at least two bubbles in each of a substantial number of said rows.

21. A menu device, comprising (a) a card, (b) successive rows of indicia on the card listing items to be selected, (c) rows of bubbles on the card in alignment with said rows of indicia, the bubbles having positions on the card representative of numbers of items to be selected, (d) each bubble having a first position projecting upwardly form the plane of the card, and a second position into which it is displaced relative to the plane of the card, by finger pressure, to indicate selection of a number of said item corresponding to bubble position on the card, (e) there being at least two bubbles in each row, (f) the bubbles in said second positions protruding downwardly from the plane of the card.

22. The device of claim 21 wherein there are at least three bubbles in each row, the three bubbles positioned to represent 1, 2 and 4 items to be selected.

23. The device of claim 21 wherein the bubbles in said first position having upper surfaces which are upwardly convex, and the bubbles in said second position having lower surfaces which are downwardly convex, across the major width dimensions of bubbles.

24. The device of claim 21 wherein the lowermost extents of the upper surfaces of the bubbles in said second positions are below the plane of the card.

25. The device of claim 21 wherein the bubbles in successive rows are staggered.

26. The device of claim 21 wherein the bubbles are arrayed to the right and to the left of indicia on the card.

27. A menu device, comprising (a) a card, (b) successive rows of indicia on the card listing items to be selected, (c) rows of bubbles on the card in alignment with said rows of indicia, the bubbles having positions on the card representative of particular items to be selected, (d) each bubble having a first position projecting upwardly from the plane of the card, and a second position into which it is displaced relative to the plane of the card, by finger pressure, to indicate selection of said items corresponding to bubble position on the card, (e) the bubbles arrayed to the right and to the left of indicia on the card, (f) the card adapted to be read by a bubble reader, and means on the card to be detected by circuitry associated with said reader to sense the orientation of the card relative to the reader.

28. The device of claim 27 wherein the bubbles in said second positions protrude downwardly with bubble shape from the plane of the card.

29. A menu device, comprising (a) a card, (b) successive rows of indicia on the card listing items to be selected, (c) rows of bubbles on the card in alignment with said rows of indicia, the bubbles having positions on the card representative of numbers of items to be selected, (d) each bubble having a first position projecting upwardly from the plane of the card, and a second position into which it is displaced relative to the plane of the card, by finger pressure, to indicate selection of a number of said items corresponding to bubble position on the card, (e) the rows of indicia positioned at opposite sides of the card, and there being one row of bubbles associated with each row of indicia, (f) the card adapted to be read by a bubble reader, and means on the card to be detected by circuitry associated with said reader to sense the orientation of the card relative to the reader.

30. The device of claim 1 wherein there is only one row of bubbles associated with each row of indicia.

* * * * *